(12) United States Patent
Egami et al.

(10) Patent No.: US 9,086,094 B2
(45) Date of Patent: Jul. 21, 2015

(54) CAGE FOR ROLLING BEARING AND ROLLING BEARING

(75) Inventors: Masaki Egami, Kuwana (JP); Kiyoshi Nakanishi, Osaka (JP); Masao Kawashima, Omaezaki (JP)

(73) Assignee: NTN CORPORATION, Osaka (JP)

( * ) Notice: Subject to any disclaimer, the term of this patent is extended or adjusted under 35 U.S.C. 154(b) by 182 days.

(21) Appl. No.: 12/737,344

(22) PCT Filed: Jul. 9, 2009

(86) PCT No.: PCT/JP2009/062517
§ 371 (c)(1),
(2), (4) Date: Jan. 12, 2011

(87) PCT Pub. No.: WO2010/007934
PCT Pub. Date: Jan. 21, 2010

(65) Prior Publication Data
US 2011/0097028 A1     Apr. 28, 2011

(30) Foreign Application Priority Data

Jul. 17, 2008   (JP) ................................ P2008-186441

(51) Int. Cl.
*F16C 33/54*   (2006.01)
*F16C 33/56*   (2006.01)
(Continued)

(52) U.S. Cl.
CPC . *F16C 33/56* (2013.01); *F16C 9/02* (2013.01); *F16C 9/04* (2013.01); *F16C 19/46* (2013.01); *F16C 2360/22* (2013.01)

(58) Field of Classification Search
CPC .... F16C 33/44; F16C 33/445; F16C 33/4629; F16C 33/565

USPC ................... 384/527, 572, 573, 575
See application file for complete search history.

(56) References Cited

U.S. PATENT DOCUMENTS 3,791,028 A * 2/1974 Missel ............................. 29/850
3,797,896 A * 3/1974 Bardach ............................ 384/8
(Continued)

FOREIGN PATENT DOCUMENTS

DE         8990148 U1    2/1991
DE   102005024071 A1   12/2005
(Continued)

OTHER PUBLICATIONS

PCT Search Report dated Aug. 4, 2009.

*Primary Examiner* — Marcus Charles
*Assistant Examiner* — Yamilka Pinero Medina
(74) *Attorney, Agent, or Firm* — Hedman & Costigan, P.C.; James V. Costigan; Kathleen A. Costigan

(57) ABSTRACT

The present invention provides a cage, for a rolling bearing, whose surface is silver-plated by using a barrel plating method capable of improving the durability thereof in a sliding test. In the cage, for the rolling bearing, made of an iron metal material and having a precious metal-plated layer formed on a surface thereof, the precious metal-plated layer is formed on a base plated layer formed on a surface of the iron metal material by using a barrel electroplating method. A surface of the base plated layer consists of a smooth surface. The precious metal-plated layer is in direct close contact with the smooth surface. The base plated layer consists of a metal having a higher ionization tendency than the precious metal formed on the surface of the base plated layer. A cavity is not present at an interface between the copper-plated layer and the silver-plated layer.

11 Claims, 11 Drawing Sheets

(51) Int. Cl.
*F16C 9/02* (2006.01)
*F16C 9/04* (2006.01)
*F16C 19/46* (2006.01)

(56) References Cited

U.S. PATENT DOCUMENTS

| | | | | |
|---|---|---|---|---|
| 4,378,274 A | * | 3/1983 | Childs | 205/143 |
| 5,096,311 A | * | 3/1992 | Motohashi et al. | 384/573 |
| 5,098,534 A | * | 3/1992 | Nakamura et al. | 205/718 |
| 5,203,228 A | | 4/1993 | Miyawaki | |
| 5,803,620 A | * | 9/1998 | Yokota | 384/580 |
| 7,846,506 B1 | * | 12/2010 | Bhattacharya et al. | 427/404 |
| 2004/0179762 A1 | * | 9/2004 | Doll et al. | 384/492 |
| 2005/0185874 A1 | * | 8/2005 | Yokota et al. | 384/572 |
| 2006/0058152 A1 | | 3/2006 | Uchiyama | |

FOREIGN PATENT DOCUMENTS

| | | |
|---|---|---|
| JP | 61-056299 A | 3/1986 |
| JP | 2005-68475 A | 3/2005 |
| JP | 2005-337374 A | 12/2005 |
| JP | 2006-169609 A | 6/2006 |
| JP | 2007-92889 A | 4/2007 |
| JP | 2008-64247 A | 3/2008 |
| WO | WO 89/12760 A1 | 12/1989 |

* cited by examiner (a)  (b)

CAGE FOR ROLLING BEARING AND ROLLING BEARING

TECHNICAL FIELD

The present invention relates to a cage for a rolling bearing and the rolling bearing and more particularly to a cage, for a rolling bearing, whose surface is plated by electrolytic silver barrel plating and the rolling bearing in which the cage is used.

BACKGROUND ART

Conventionally a rolling bearing for use in engines of automobiles, motorcycles, and the like and particularly a needle roller bearing having a cage is frequently used by silver-plating the surface of the cage to prevent the surface thereof from seizure. The cage of the needle roller bearing is produced by stamping and the cage retains needle rollers at regular intervals. The entire surface of the cage produced by stamping is silver-plated. As a method of surface-treating the cage, a barrel plating method of performing plating treatment by immersing an object in a plating solution with the object accommodated inside a barrel in which electrodes are disposed and electrically conducting the object, while the plating solution is being stirred is known.

FIG. 11 shows the outline of the barrel plating method. FIG. 11 is a flow diagram of the barrel electroplating method.

The barrel electroplating method is carried out in the steps of cleaning—ground plating—cleaning—main plating—cleaning and drying with an object to be plated accommodated in a barrel. The cleaning step includes degreasing cleaning, acid cleaning, and water cleaning. At the time of the main plating, to improve the quality of plating, strike plating is often used in combination with the barrel electroplating method.

According to the barrel electroplating method, it is possible to simultaneously plate a plurality of fine objects difficult to be plated by directly mounting an electrode thereon and objects having different sizes. Therefore the barrel plating method is frequently used for the cage for the rolling bearing.

As a barrel plating apparatus, to improve defective conduction of an electricity-feeding portion, there are disclosed-a plating apparatus (see patent document 1) having a construction which allows the electricity-feeding portion to be conductive by supporting an electricity-feeding shaft by an electricity-feeding bearing device and a plating apparatus (see patent document 2) capable of allowing a plating-tank and a barrel to be electrically conductive by merely placing the barrel on the plating tank.

The service conditions, where the silver plated, cage for the rolling bearing is used, have become more severe than conventional service conditions. Thus the improvement of the durability of the cage in a sliding operation is required.

PRIOR ART DOCUMENT

Patent Document

Patent document 1: Japanese Patent Publication No. 05-61360

Patent document 2: Japanese Patent Application Laid-Open No. 2005-68475

DISCLOSURE OF THE INVENTION

Problem to be Solved by the Invention

The present invention has been made to cope with the above-described problems. It is an object of the present invention to provide a cage for a rolling bearing which has an improved durability in a sliding operation and a cage, for a rolling bearing, where the surface of the cage is silver-plated by using a barrel plating method. The present invention provides the rolling bearing in which the cage is used.

Means for Solving the Problem

The present inventors have energetically made researches to solve the above-described problem of the cage for the rolling bearing and found that in the cage, for the rolling bearing, plated by barrel plating, there is a case in which a cavity is found at an interface between a copper-plated layer formed by ground treatment and a silver-plated layer.

The present invention has been made based on the above-described knowledge. The cage for a rolling bearing of the present invention is made of an iron metal material and has a precious metal-plated layer on a surface thereof. The precious metal-plated layer is formed on a base plated layer formed on a surface of the iron metal material by using a barrel electroplating method. A surface of the base plated layer consists of a smooth surface. The precious metal-plated layer is in direct close contact with the smooth surface.

The base plated layer consists of a metal having a higher ionization tendency than the precious metal formed on the surface of the base plated layer.

In the cage for the rolling bearing of the present invention, the precious metal-plated layer formed on the surface of the round ase plated layer is a silver-plated layer, and the ground plated layer is a copper-plated layer.

A cavity is not present at a boundary surface between the copper-plated layer and the silver-plated layer.

The silver-plated layer is a lamination of a strike silver-plated layer and a finishing silver-plated layer sequentially formed on the copper-plated layer.

The copper-plated layer is formed by using a barrel electroplating method.

The rolling bearing of the present invention has a cage, made of an iron metal material, which retains a plurality of rolling elements. The cage is used for the rolling bearing of the present invention.

The rolling elements of the rolling bearing are needle rollers.

The rolling bearing of the present invention is used for a large-end portion of a connecting rod of an engine, a small-end portion of the connecting rod thereof or a supporting shaft of a crankshaft.

Effect of the Invention

In the plated layer formed on the surface of the cage for the rolling bearing of the present invention, the surface of the ground plated layer consists of the smooth surface. The precious metal-plated layer is in direct close contact with the smooth surface. Therefore it is possible to improve the durability of the cage in a sliding operation. Thus the cage has a sufficient durability in a use condition more severe than the conventional use condition.

BEST MODE FOR CARRYING OUT THE INVENTION

Figure 1:
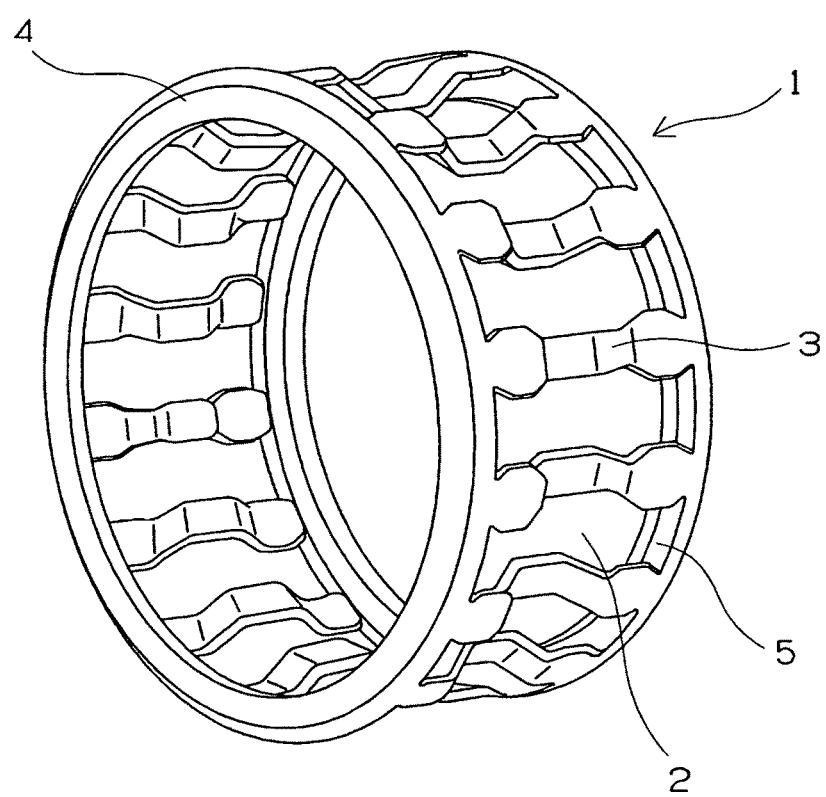
FIG. 1 is a perspective view of a cage for a rolling bearing in which needle rollers are used as rolling elements.

FIG. 1 shows the construction of a cage for a rolling bearing of the present invention. FIG. 1 is a perspective view of the cage for the rolling bearing having needle rollers made of an iron metal as its rolling elements.

A cage 1 has pockets 2 for holding the needle rollers. Intervals between the needle rollers are held by column parts 3 disposed between the pockets 2 and both-side ring parts 4, 5 to which the column parts 3 are fixed. To hold the needle rollers, each of the column parts 3 has a flat complicated configuration in which a central portion is bent to form a mountain and a valley on each column part and in a planar view, circularly bulged at a portion where the column parts 3 are connected to the both-side ring parts 4, 5. In the method of producing the cage of the present invention, it is possible to adopt a method of shaving out a ring from a material and forming the pockets 2 by punching in a press work or a method of pressing a flat plate, thereafter cutting the flat plate to an appropriate length, rounding the cut parts in the shape of a ring, and joining the cut parts with each other by welding. A silver-plated layer is formed on a surface of the cage 1 by a barrel electroplating method. As a base plated layer of the silver-plated layer, a copper-plated layer is formed. The surface of the cage forming the plated layer is a portion thereof which contacts lubricating oil or grease. The entire surface of the cage 1 including the surfaces of the pockets 2 which contact the needle rollers is plated by the barrel electroplating.

The silver-plated layer formed by the barrel plating on the surface of the cage for the rolling bearing made of the iron metal of the present invention is layered on the copper-plated layer which is the base layer formed on the surface of an iron metal material. The surface of the copper-plated layer which is the base plated layer consists of a smooth surface. The silver-plated layer is indirect close contact with the smooth surface. Owing to the direct close contact between the silver-plated layer and the copper-plated layer, a plated layer is obtained on the surface of the cage without forming a cavity at the boundary surface between both layers.

Figure 2:
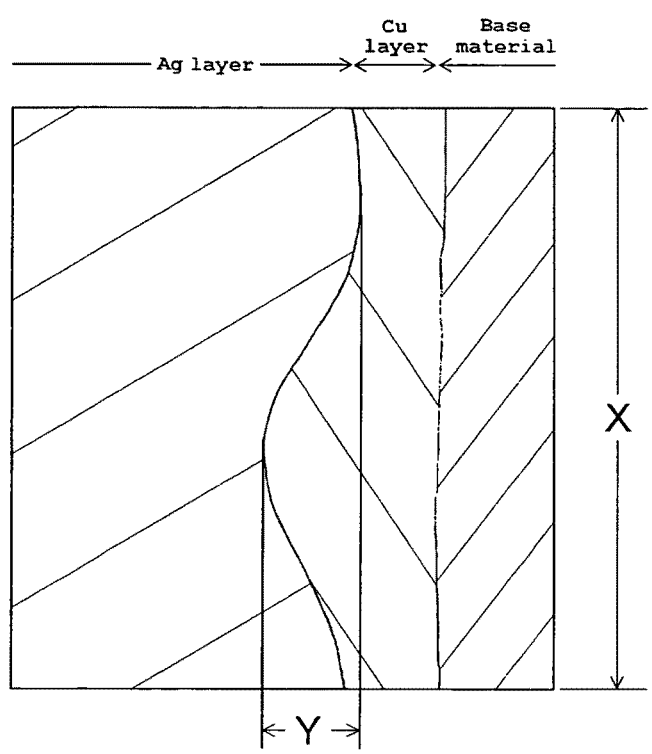
FIG. 2 is a schematic view showing a state in which a copper-plated layer and a silver-plated layer are formed on a surface of a base material.

FIG. 2 shows a schematic view in which the copper-plated layer (Cu layer) and the silver-plated layer (Ag layer) are sequentially formed on the surface of the iron metal material which is the base material.

That the silver-plated layer and the copper-plated layer are in direct close contact means a case in which when a cut surface of the plated layer is observed by using an SEM at 2500-fold magnification, the silver-plated layer and the copper-plated layer closely contact each other at an interface thereof and that a space or a cavity is not found at the interface.

That the surface of the copper-plated layer consists of the smooth surface means a case in which when a cut surface of the copper-plated layer is observed by using the SEM at 2500-fold magnification, there is no unevenness having a distance (Y) not less than 5 μm between a the highest point of the profile peak and the lowest point of the profile valley in a length (X) of 10 μm along a boundary line between the silver-plated layer and the copper-plated layer. The surface of the copper-plated layer may include a large waviness curve when the difference (Y) is in a range satisfying this condition.

That in the present invention, the surface of the copper-plated layer which is the ground plated layer consists of the smooth surface and that the silver-plated layer is in direct close contact with the smooth surface means a case in which in the case of the cage, it is necessary that at all observed portions, the above-described conditions are satisfied when cut surfaces of the cage circumferentially divided into five portions are observed by using the SEM at 2500-fold magnification.

The condition that the surface of the copper-plated layer consists of the smooth surface does not apply to portions where the base material bends and edges thereof. Thus these portions are excluded.

The plated layer of the cage for the rolling bearing in which the ground consists of the copper-plated layer and the surface layer consists of the silver-plated layer has been described. The present invention is applicable to a case in which when the plated layer is formed on a cage made of the iron metal, a precious metal-plated layer having a smaller ionization tendency than that of a metal of the base plated layer is formed on the base plated layer.

As the iron metal material to be used for the cage, bearing steel, carburized steel, carbon steel for machine structural use, and cold rolled steel are listed.

As the metal of the base plated layer, copper, nickel, zinc, and tin are listed.

As the precious metal having a smaller ionization tendency than that of the metal of the base plated layer, copper, silver, gold, and platinum are listed.

The deposit thickness of the ground and that of the surface layer can be arbitrarily set in a range of 3 to 50 μm.

Figure 3:
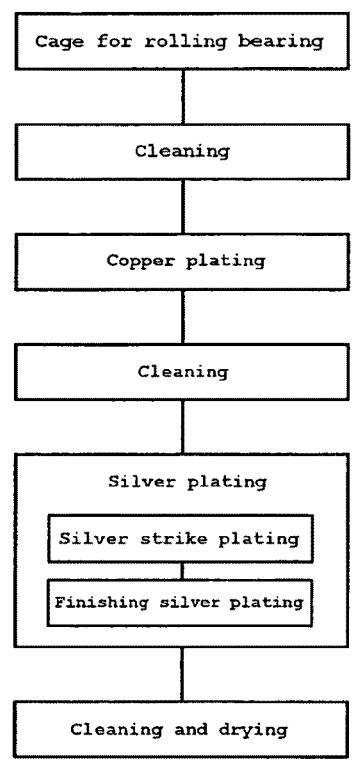
FIG. 3 shows steps of a barrel electroplating method of the present invention.

The step of the barrel electroplating method is shown in FIG. 3. FIG. 3 shows the step of the barrel electroplating of the present invention.

The barrel electroplating method is carried out at the steps of cleaning—copper plating—cleaning—silver plating—cleaning and drying with the cage for the rolling bearing made of the iron metal accommodated inside a barrel. The cleaning step includes degreasing cleaning, acid cleaning, and water cleaning.

The silver plating step of the above-described steps is performed at two stages of a strike silver plating step and a finish silver plating step.

Because silver is more electrochemically precious than the base metal, i.e., small in the ionization tendency, there occurs a case in which silver precipitates by substitution when the base metal is immersed in a silver plating solution. To suppress the precipitation by substitution, the strike silver plating step is provided.

To obtain the construction in which the surface of the copper-plated layer which is the ground plated layer consists of the smooth surface and the silver-plated layer is in direct close contact with the smooth surface, for example, the barrel electroplating is performed by carrying out methods described below. In the steps of the barrel plating shown in FIG. 3, (1) in the silver strike plating step, a silver ion concentration in the silver plating solution is decreased; (2) in the silver strike plating step, a free cyanide ion concentration in the silver plating solution is increased; (3) the cage is energized before the silver strike plating starts; (4) a barrel is placed in a rotating state before the silver strike plating starts. These methods may be carried out independently or in combination.

To form the copper-plated layer which forms the base plated layer, including the cleaning step, it is possible to adopt known methods used in the barrel electroplating art.

Figure 4:
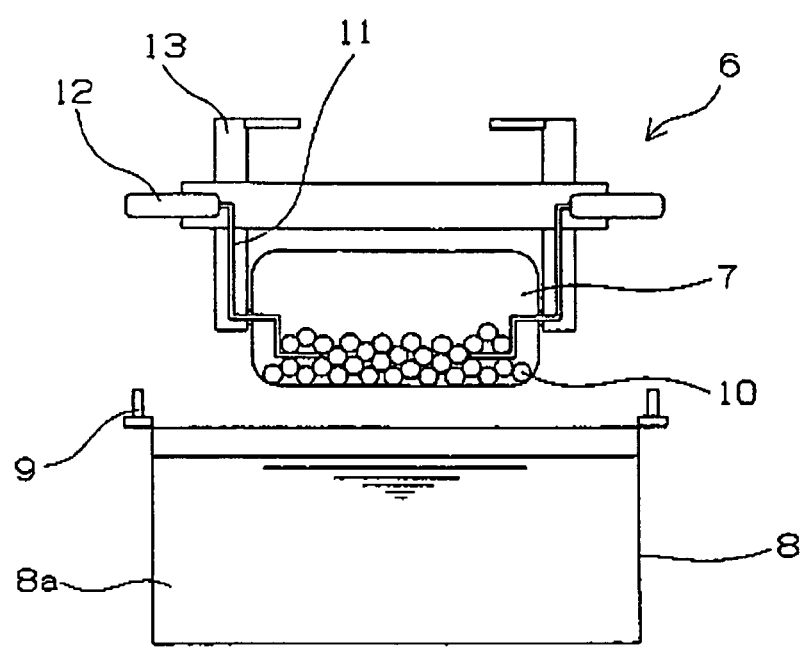
FIG. 4 shows a barrel electroplating apparatus as viewed from the side of a barrel.

FIG. 4 shows an example of a barrel plating apparatus to be used at the barrel plating steps. FIG. 4 shows a barrel electroplating apparatus as viewed from the side of the barrel and shows one tank of the barrel electroplating apparatus having a plurality of tanks arranged continuously.

A barrel electroplating apparatus 6 is constructed of a barrel 7, a plating tank 8, and an electricity-feeding apparatus 9. The barrel 7 is polygonal drum-shaped and approximately tubular capable of accommodating a large number of cages 10 and is rotatable. By opening and closing a closed lid not shown in the drawings, the cages 10 can be supplied into the barrel 7. The material of the barrel 7 is corrosion-resistant. For example, poly vinyl chloride, polypropylene or acrylic resin is used therefor. A large number of holes having small diameters are so formed through the barrel 7 that the cages 10 do not drop and that a plating solution 8a is capable of freely entering and leaving the barrel 7. The barrel 7 may be cylindrical and of a sealed type or have an opening.

To feed electricity to the cages 10, an electricity-feeding lead 11 is inserted into a large number of the cages 10. The electricity-feeding lead 11 is connected to an energizing electrode 12.

A hanger 13 is formed at both side edges of the barrel 7. With the barrel 7 being hung by the hanger 13, the cages 10 are immersed in the plating solution 8a of the plating tank 8. The hangers 13 are provided with an energizing electrode-mounting portion on which the energizing electrode 12 is mounted.

The size of the plating tank 8 is so set that the barrel 7 can be immersed therein. An inner surface of the plating tank 8 is composed of an acid-resistant and an alkali-resistant material. An anode is provided in the plating solution 8a and connected to an anode terminal (not shown in the drawings).

A plated film is formed on the cages 10 by immersing the barrel 7 accommodating the cages 10 therein in the plating solution 8a of the plating tank 8 and energizing the cages 10 immersed in the plating solution 8a.

The electricity-feeding apparatus 9 for energizing the cages 10 is used to feed electricity to the anode immersed in the plating solution 8a and the cages 10 inside the barrel 7 to the cathode from an unshown power source through a rectifier.

The cage of the present invention is preferable as the cage, for the rolling bearing, having the silver-plated layer on the surface thereof, particularly preferable as the cage for the rolling bearing having needle rollers as rolling elements thereof, and further for a case in which the rolling bearing having the needle rollers as the rolling elements thereof is used for a large-end portion of a connecting rod of an engine, a small-end portion of the connecting rod thereof or a supporting shaft of a crankshaft.

Figure 5:
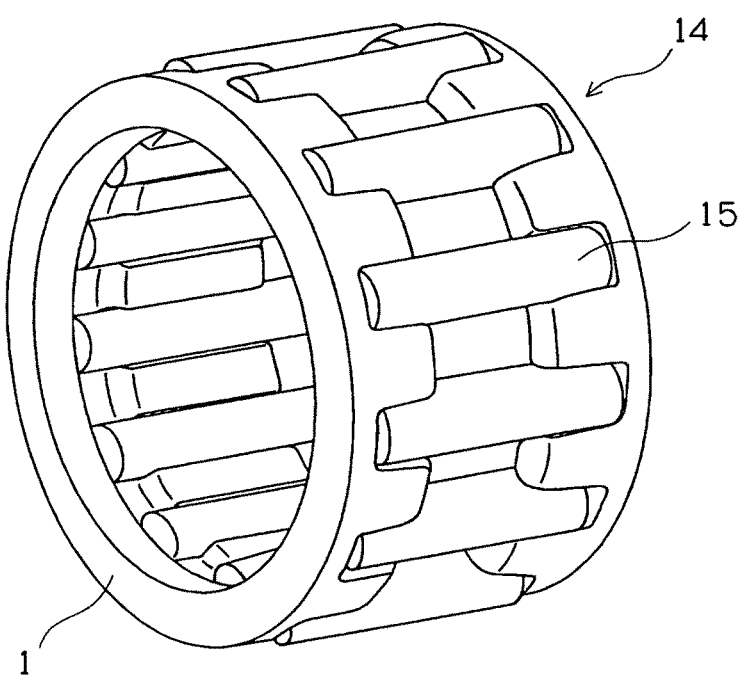
FIG. 5 is a perspective view showing a needle roller bearing.

FIG. 5 is a perspective view showing a needle roller bearing which is one example of the rolling bearing. As shown in FIG. 5, a needle roller bearing 14 is constructed of a plurality of needle rollers 15 and a cage 1 retaining the needle rollers 15 at regular or irregular intervals. A bearing for the connecting rod of an engine is not provided with an inner ring and an outer ring. The bearing for the connecting rod of an engine is used by directly inserting a shaft such as a crankshaft and a piston pin into the inside-diameter side of the cage 1 and fitting the outside-diameter side of the cage 1 in an engaging hole of the connecting rod which is a housing. Because the needle roller bearing 14 is not provided with the inner ring and the outer ring and because the needle rollers 15 whose diameters are small as compared with its length are used as the rolling elements thereof, the needle roller bearing 14 is smaller than ordinary rolling bearings having the inner and outer rings.

Figure 6:
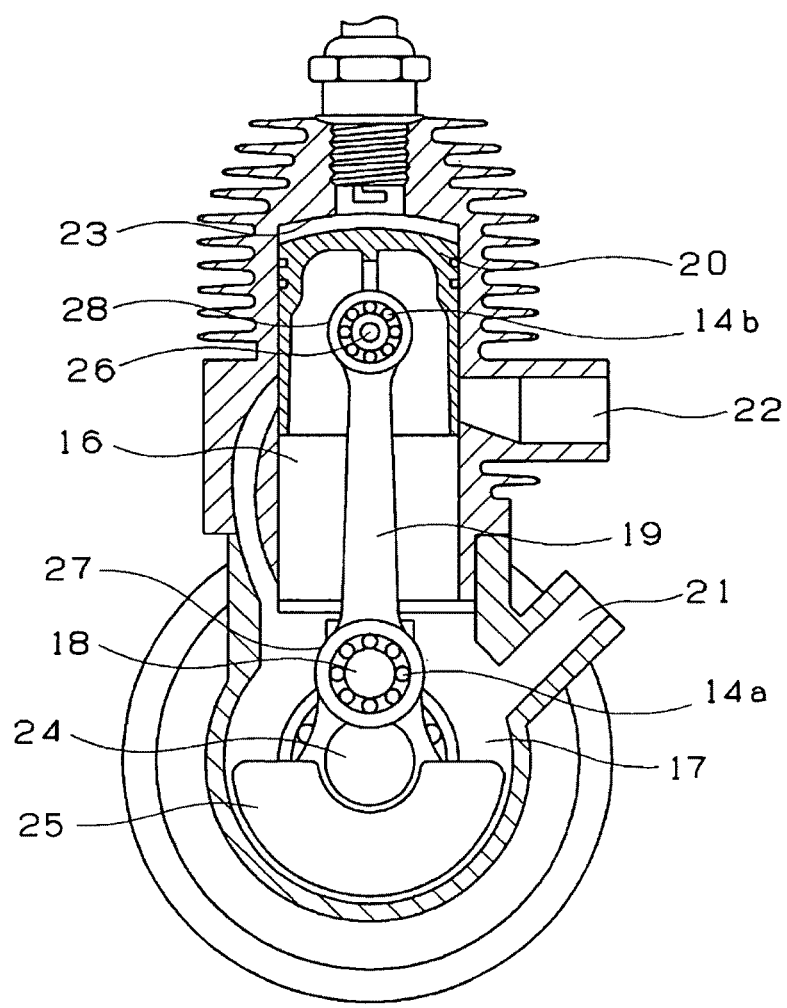
FIG. 6 is a longitudinal sectional view of a two-cycle engine.

FIG. 6 is a vertical sectional view of a two-cycle engine in which the needle roller bearing is used.

As shown in FIG. 6, the two-cycle engine has a piston 20 making a linear reciprocating motion by the combustion of a mixed gas of gasoline and lubricating oil which is engine oil, a crankshaft 18 outputting a rotational motion, and a connecting rod 19 connecting the piston 20 and the crankshaft 18 to each other to convert the linear reciprocating motion to the rotational motion. The crankshaft 18 rotates about a rotational shaft 24. A balance weight 25 takes balance in the rotation.

The connecting rod 19 has a large-end portion 27 at a lower portion of a straight rod and a small-end portion 28 at an upper portion thereof. The crankshaft 18 is rotatably supported via a needle roller bearing 14a mounted on an engaging hole of the large-end portion 27. A piston pin 26 coupling the piston 20 and the connecting rod 19 to each other is rotatably supported via a needle roller bearing 14b mounted on an engaging hole of the small-end portion 28 of the connecting rod 19.

After the mixed gas of the gasoline and the lubricating oil is fed from an inlet hole 21 to a crankcase 17, the mixed gas is introduced into a combustion chamber 23 disposed above a cylinder 16 according to a vertical motion of the piston 20 and burnt. A burnt exhaust gas is discharged from an exhaust hole 22.

By using the needle roller bearing of the present invention, even the two-cycle engine or a four-cycle engine downsized or having a high output is excellent in the durability thereof.

EXAMPLES

Examples 1 through 4 and Comparative Example 1

Electrolytic copper plating treatment was performed on cages (carburized quenching, see FIG. 1), for an SCM415 needle roller bearing, each having a dimension of an outside diameter of 45 mm×an inside diameter of 35 mm×a width of 22 mm and SUJ2 ring-shaped specimens (immersion quenching) each having a dimension of an outside diameter of 40 mm×an inside diameter of 20 mm×t10 mm (subsidiary curvature: R60 mm) to form copper-plated films each having a thickness of 5 μm as ground films. Thereafter silver strike plating and silver plating treatment were performed on the cages and the specimens by using a barrel electroplating apparatus in conditions shown in table 1 to form silver-plated film layers each having a thickness of 25 μm.

In each example and comparative example, the silver strike plating was performed in the conditions shown in table 1. Regarding whether an unenergized state was present, a case in which the cages or the SUJ2 ring-shaped specimens were placed in an energized state (a state in which the cages or the SUJ2 ring-shaped specimens were connected to a rectifier connected to the power source) before the silver strike plating started with the cages or the SUJ2 ring-shaped specimens immersed in a plating solution was marked as "not present", whereas a case in which energization started after the cages or the SUJ2 ring-shaped specimens were immersed in the plating solution was marked as "present".

By using the obtained cages and ring-shaped specimens, sections of plated film layers were observed and a sliding test was conducted, as shown below.

<Observation of Section of Plating>

Figure 8:
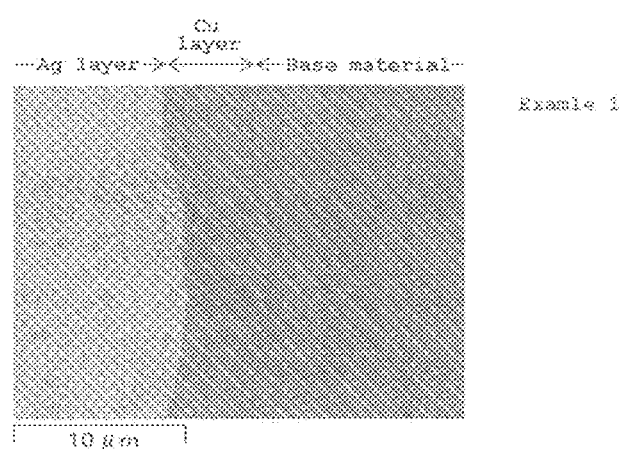
FIG. 8 shows a sectional photograph of a plated layer of an example 1.
Figure 9:
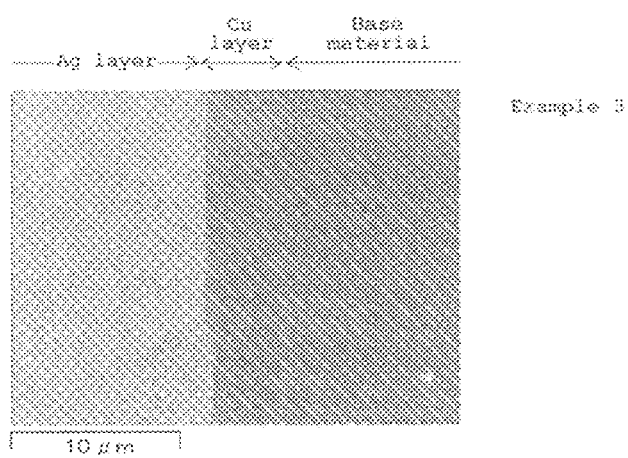
FIG. 9 shows a sectional photograph of a plated layer of an example 3.
Figure 10:
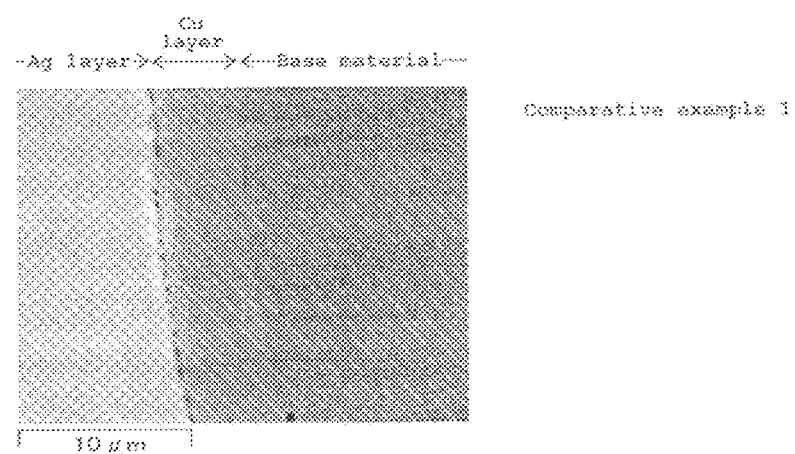
FIG. 10 shows a sectional photograph of a plated layer of a comparative example 1.
Figure 11:
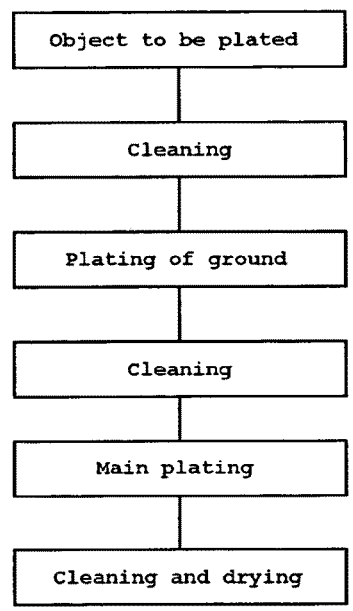
FIG. 11 is a flow diagram of a barrel electro plating method.

After the outside-diameter portion of each cage was cut to an appropriate size and resin filling was performed, the sections of the plated film layers were formed by using a cross section polisher (produced by JEOL Ltd.: SM09010) whose light source was Ar laser to observe a close contact state of the interface between the ground copper (Cu)-plated-film-layer and the silver (AM-plated film layer by an SEM. In the observation, the cage of each example was circumferentially divided into five portions to observe cut surfaces. As a result of the observation, a case in which the surface of the copper-plated layer which was the ground base plated layer consisted of a smooth surface and the silver-plated layer was indirect close contact with the smooth surface was marked by "Good", whereas a case in which a space was present at the interface was marked by "Bad". Table 1 shows the results. Photographs of sections of the plated film layers of the examples 1, 3, and the comparative example 1 are shown in FIGS. 8, 9, and 10 respectively.

<Sliding Test>

Figure 7:
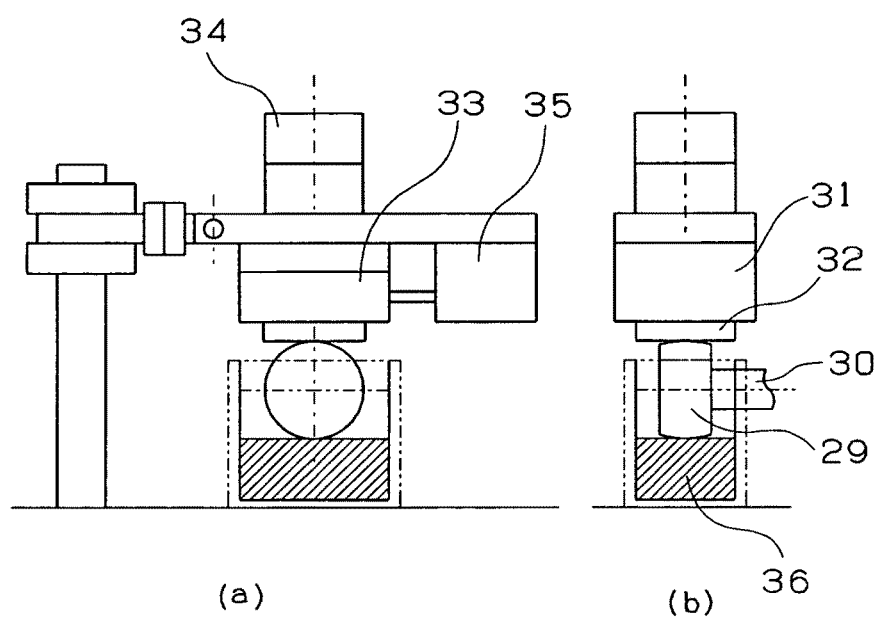
FIG. 7 shows a sliding tester (Savin type frictional wear tester).

A sliding tester (Savin type frictional wear tester) shown in FIG. 7 was used. FIG. 7(a) and FIG. 7(b) show a front view and a side view respectively.

A ring-shaped specimen 29 is mounted on a rotational shaft 30, and a steel plate 32 is fixed to an air slider 33 of an arm portion 31. While a predetermined load 34 is being applied to the ring-shaped specimen 29 from an upper portion in FIG. 7, the ring-shaped specimen 29 contacts the steel plate 32 with the ring-shaped specimen 29 rotating. Lubricating oil is supplied to an outside-diameter surface of the ring-shaped specimen 29 from a felt pad 36 impregnated with the lubricating oil. A frictional force generated when the ring-shaped specimen 29 is rotated is detected by a load cell 35.

As the steel plate 32, a carburized steel SCM415 quenched and tempered (Hv 700) was used. As the lubricating oil, Mobil Verocity Oil No. 3 (produced by Exxon Mobil Corporation: VG2) was used. The load was 75N. The sliding speed was 5 m/second.

For evaluation, by examining the period of time from the time when the operation started till the friction coefficient increased rapidly as a result of peeling of the silver (Ag)-plated film layer from the copper (Cu)-plated film layer, close contact properties of the plated films were compared with one another. The upper limit of the operation period of time was set to 60 minutes.

TABLE 1

|  | Example | | | | Comparative example |
| --- | --- | --- | --- | --- | --- |
|  | 1 | 2 | 3 | 4 | 1 |
| Silver strike plating | | | | | |
| Silver cyanide concentration, g/liter | 0.1 | 1 | 1 | 1 | 1 |
| Potassium cyanide concentration, g/liter | 80 | 200 | 80 | 80 | 80 |
| Electric current, A/dm2 | 2 | 2 | 2 | 2 | 2 |
| Treatment period of time (second) | 1200 | 600 | 180 | 180 | 180 |
| Whether unenergized state is present | Present | Present | Non-present | Present | Present |
| Time when rotation of barrel started | After cages or specimens is immersed in plating solution | After cages or specimens is immersed in plating solution | After cages or specimens is immersed in plating solution | Before cages or specimens is immersed in plating solution | After cages or specimens is immersed in plating solution |
| Silver plating | | | | | |
| Silver cyanide concentration, g/liter | 25 | 25 | 25 | 25 | 25 |
| Potassium cyanide concentration, g/liter | 80 | 80 | 80 | 80 | 80 |
| Electric current, A/dm2 | 0.5 | 0.5 | 0.5 | 0.5 | 0.5 |
| Treatment period of time (second) | 2400 | 2400 | 2400 | 2400 | 2400 |
| Evaluation result | | | | | |
| Close contact state of Cu—Ag interface | Good | Good | Good | Good | Bad |
| Operating period of time (minute) before peeling occurs | >60 | >60 | >60 | 43 | 9 |

In each of the examples, the operating period of time took as long as not less than 43 minutes before peeling occurred and thus each of the examples was excellent in the durability. As shown by the sectional photographs in FIGS. 8 and 9, the interface between the silver layer and the copper layer were indirect close contact. On the other hand, in FIG. 10 showing the sectional photographs of the comparative example 1, cavities were present at the interface between the silver layer and the copper layer.

INDUSTRIAL APPLICABILITY

The cage of the present invention can be utilized for the rolling bearing, and particularly for a large-end portion of a connecting rod of an engine, a small-end portion of the connecting rod thereof or a supporting shaft of a crankshaft.

EXPLANATION OF REFERENCE SYMBOLS AND NUMERALS

1: cage for rolling bearing in which needle rollers are used as rolling elements
2: pocket
3: column part
4: ring part
5: ring part
6: barrel electroplating apparatus
7: barrel 8: plating tank
9: electricity-feeding apparatus
10: cage for rolling bearing
11: electricity-feeding lead
12: energizing electrode
13: hanger
14: needle roller bearing
15: needle roller
16: cylinder
17: crankcase
18: crankshaft
19: connecting rod
20: piston
21: inlet hole
22: exhaust hole
23: combustion chamber
24: rotational shaft
25: balance weight
26: piston pin
27: large-end portion
28: small-end portion

The invention claimed is:

1. A cage for a rolling bearing, made of an iron metal material and having a precious metal-plated layer on a surface thereof, wherein said precious metal-plated layer is formed on a base plated layer formed on a surface of said iron metal material by using a barrel electroplating method; a surface of said base plated layer consists of a smooth surface; and said precious metal-plated layer is in direct close contact with said smooth surface
    wherein said precious metal-plated layer is a silver-plated layer; and said base plated layer is a copper-plated layer.

2. The cage for a rolling bearing according to claim 1, wherein a cavity is not present at an interface between said copper-plated layer and said silver-plated layer.

3. The cage for a rolling bearing according to claim 1, wherein said base copper-plated layer is formed by a process that uses a barrel electroplating method where a barrel is rotated before said plating starts.

4. The cage for a rolling bearing according to claim 1, wherein said silver-plated layer is a lamination of a strike silver-plated layer and a finishing silver-plated layer sequentially formed on said copper-plated layer.

5. The cage for a rolling bearing according to claim 4, wherein said strike silver-plated layer is formed in a silver plating solution having a silver ion concentration that is lower than a silver ion concentration in a silver plating solution forming said finishing silver-plated layer.

6. The cage for a rolling bearing according to claim 4, wherein said strike silver-plated layer is formed in a silver plating solution having a free cyanide ion concentration that is higher than a free cyanide ion concentration in a silver plating solution forming said finishing silver-plated layer.

7. The cage for a rolling bearing according to claim 4, wherein said strike silver-plated layer is formed in a silver plating solution, said cage is placed in an energized state before silver plating starts.

8. The cage for a rolling bearing according to claim 4, wherein said strike silver-plated layer is formed in a barrel electroplating method where a barrel is rotated before said plating starts.

9. A rolling bearing having a cage said cage being adapted to retain a plurality of rolling elements said cage being made of an iron metal material and having a precious metal-plated layer on a surface thereof, wherein said precious metal-plated layer is a silver plated layer formed on a base plated layer of copper formed on a surface of said iron metal material by using a barrel electroplating method where a surface of said base copper plated layer consists of a smooth surface; and said precious metal-plated layer is in direct close contact with said smooth surface.

10. The rolling bearing according to claim 9, wherein said rolling elements are needle rollers.

11. The rolling bearing according to claim 10, wherein said rolling bearing is adapted to be positioned in a large-end portion of a connecting rod of an engine, a small-end portion of said connecting rod thereof or a supporting shaft of a crankshaft.

* * * * *